United States Patent
Osaka et al.

(10) Patent No.: US 6,287,020 B1
(45) Date of Patent: Sep. 11, 2001

(54) OBSERVATION APPARATUS AND FUSION SPLICER FOR OPTICAL FIBERS

(75) Inventors: Keiji Osaka; Kazunari Hattori; Tsutomu Watanabe; Akira Tanabe, all of Yokohami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/172,679

(22) Filed: Oct. 15, 1998

(30) Foreign Application Priority Data

Oct. 15, 1997 (JP) .................................................. 9-281872

(51) Int. Cl.⁷ .................................................. G02B 6/255
(52) U.S. Cl. ............................... 385/96; 385/95; 385/97; 385/98; 385/99; 356/73.1
(58) Field of Search .................................... 385/95, 96, 97, 385/98, 99; 356/73.1; 65/152

(56) References Cited

U.S. PATENT DOCUMENTS

| | | |
|---|---|---|
| 4,439,022 | 3/1984 | Gebhardt et al. ..................... 350/572 |
| 4,613,214 | 9/1986 | Brugger et al. ....................... 350/511 |
| 4,878,933 | 11/1989 | Yamada et al. ........................... 65/29 |
| 4,882,497 * | 11/1989 | Inoue et al. ......................... 356/73.1 |
| 5,011,259 | 4/1991 | Lieber et al. ...................... 350/96.21 |
| 5,158,591 * | 10/1992 | Onodera et al. ........................ 65/152 |
| 5,638,476 * | 6/1997 | Zheng .................................... 385/96 |
| 5,870,195 | 2/1999 | Sasan .................................. 356/355 |
| 5,904,413 * | 5/1999 | Ruegenberg et al. ............... 356/73.1 |
| 6,034,718 * | 3/2000 | Hattori .................................. 385/97 |

FOREIGN PATENT DOCUMENTS

| | | |
|---|---|---|
| 28 54 648 | 7/1980 | (DE) . |
| 33 35 136 | 4/1985 | (DE) . |
| 01107218 | 4/1989 | (JP) . |
| 1-107218 | 4/1989 | (JP) . |
| JP 08334691 * | 12/1996 | (JP) . |
| 8-334691 | 12/1996 | (JP) . |
| 9-80306 | 3/1997 | (JP) . |
| 2635763 | 4/1997 | (JP) . |

OTHER PUBLICATIONS

Patent Abstracts of Japan, JP 9–043447 A (Fujikura Ltd Nippon Telegr & Teleph Corp) Feb. 14, 1997.
Patent Abstracts of Japan, P1231, p. 47, JP 3–1023040 A (Sumitomo Electric Ind Ltd) Apr. 26, 1991 Abstract.
Patent Abstracts of Japan, P1100, p. 152, JP 2–157712 A (Fujikura Ltd) Jun. 18, 1990 Abstract.
Patent Abstracts of Japan, P976, p. 13, JP 1–235907 A (Furukawa Electric Co Ltd) Sep. 20, 1989 Abstract.
Patent Abstracts of Japan, P911, p. 14, JP 1–107218 A (Nippon Telegr & Teleph Corp) Apr. 25, 1989 Abstract.
Patent Abstracts of Japan, P379, p. 87, JP 60–61703 A (Nippon Denshin Denwa Kosha) Apr. 9, 1985 Abstract.
Patent Abstracts of Japan, vol. 015, No. 088 (P–1174), Mar. 4, 1991 & JP 02–304403 A, (Furukawa Electric Co., Ltd.: The), Dec. 18, 1990.
Patent Abstracts of Japan. vol. 011, No. 260 (P–608), Aug. 22, 1989 & JP 62 063905 A, (Furukawa Electric Co., Ltd: The: Others: 01), Mar. 20, 1987.

* cited by examiner

Primary Examiner—Frank G. Font
Assistant Examiner—Sang H. Nguyen
(74) Attorney, Agent, or Firm—Pillsbury Winthrop LLP

(57) ABSTRACT

Each of imaging optical systems has a post-lens system having a front focus at a position of a rear focus of a pre-lens system. Each of the optical axes is set in a direction normal to the optical axes of optical fibers and different from the normal direction to a placement surface of the optical fibers. Each of image pickup planes of CCDs is inclined relative to the optical axis of the imaging optical system so that the longer an object distance of each optical fiber among the optical fibers, the shorter an image distance thereof, and each image pickup plane is located in parallel to the optical axes of the optical fibers.

11 Claims, 8 Drawing Sheets

OBSERVATION APPARATUS AND FUSION SPLICER FOR OPTICAL FIBERS

BACKGROUND OF THE INVENTION

1. Field of the Invention

The present invention relates to an observation apparatus for observing positions of optical fibers and a fusion splicer using the same for optical fibers.

2. Related Background Art

A conventional observation apparatus for optical fibers is disclosed in Japanese Laid-open Patent Application No. 1-107218. The conventional observation apparatus for optical fibers described in this application is an apparatus for illuminating light from obliquely above to a plurality of optical fibers fixed in a row on a support frame and for picking up an image of the neighborhood of end faces at spliced portions of the optical fibers illuminated by the light, through a TV camera located obliquely below.

FIG. 9 is a drawing to show an optical system according to a conventional observation apparatus for optical fibers. As shown in FIG. 9, an image pickup plane 100 of a TV camera is located normally to the optical axis 102 of optical lens 101 and the optical system is adjusted so that the focus is achieved on the image pickup plane 100 intersecting with the optical axis 102. Accordingly, the focus deviates with increasing distances from this position, causing the image to be blurred; therefore, the number of the optical fibers for which the image could be displayed in a screen was limited to four pairs if their outside diameter portions were to be measured with the accuracy of several μm or less.

Incidentally, the observation apparatus for optical fibers was often incorporated in the fusion splicer for optical fibers. In that case, observation was carried out prior to fusion splicing so as to check whether an offset of axis or the like occurred between optical fibers to be fused and spliced with each other. Recently, the number of pairs of optical fibers to be spliced at one time with an fusion splicer for optical fibers has been increased, in order to increase the efficiency of splicing of optical fibers. At present, the technology for fusion-splicing twelve fiber pairs at one time is established, and the technology for fusion-splicing sixteen fiber pairs or twenty four fiber pairs at one time is also under research and development.

SUMMARY OF THE INVENTION

In the above observation apparatus for optical fibers, however, only four fiber pairs were allowed to be observed in one screen; and, because the offset of axis had to be measured while observing each optical fiber perpendicularly thereto, the splicing time largely increased with increase in the number of pairs of optical fibers to be fusion-spliced at one time, as shown in Table 1 below.

TABLE 1

| Number of optical fiber pairs | Number of observations (4 optical fiber pairs are observed in each observation) | Splicing time |
|---|---|---|
| 4 | 2 | 45 sec |
| 8 | 4 | 70 sec |
| 12 | 6 | 95 sec |
| 16 | 8 | 120 sec |
| 24 | 12 | 145 sec |

In the splicing time, the time necessary for actual fusion splicing was constant irrespective of the number of fibers, and most of the increase in the splacing time was due to the time necessary for observation of positions and end-face states of the optical fibers by the observation apparatus for optical fibers. Since the observation time of optical fibers increased with the increase in the number of optical fiber pairs as described, the increase in the numbers of pairs of optical fibers to be spliced at one time did not result in increasing the efficiency of splicing of optical fibers accordingly.

Japanese Laid-open Patent Application No. 2-304403 discloses a conventional observation apparatus for optical fibers. The conventional observation apparatus for optical fibers described in this application was designed to make an attempt to bring more optical fibers into focus by inclining the image pickup plane of the image pickup device relative to the optical axis. This observation apparatus for optical fibers, however, needed a device for driving a mirror, because it used the mirror as a means for observation in two directions. It was also difficult to determine an appropriate position and an appropriate angle of the image pickup plane, because the position of the virtual image (mirror image) changed depending upon adjustment upon mounting of the mirror. Further, the aforementioned application describes that in practical application of the apparatus multiple pairs of optical fibers must be observed in sections. It was thus eventually impossible to bring all of multiple pairs of optical fibers into focus.

Further, with either of the above observation apparatus for optical fibers, magnifications of obtained images were not constant but varied depending upon the positions of optical fibers, so that arithmetic procedure or image processing was necessary for correction for the magnifications of images to a common magnification. The time for observation of optical fibers was lengthened by this processing as well and it also posed a problem in terms of the size and cost of apparatus.

An object of the present invention is to solve the above-described problems, thereby providing an observation apparatus for optical fibers and an fusion splicer for optical fibers capable of accurately observing positions and end face states of all of even more optical fibers within a short time. Another object of the invention is to provide an observation unit suitable for use in these apparatus.

An observation apparatus for optical fibers according to the present invention comprises an imaging optical system located opposite to plural pairs of optical fibers, and an image pickup device for picking up images of the optical fibers formed by the imaging optical system, wherein the imaging optical system comprises, in order from the side of the optical fibers, a pre-lens system, an aperture stop having an aperture at a position of a rear focus of the pre-lens system, and a post-lens system having a front focus at the position of the rear focus of the pre-lens system.

A more preferred embodiment of the observation apparatus for optical fibers according to the present invention is an observation apparatus for optical fibers for observing a plurality of optical fibers, in which an imaging optical system and image pickup means (an image pickup device) are disposed in order from the side of the plural optical fibers on each of two different optical axes that are normal to the optical axes of the plural optical fibers located in parallel and in a flat shape and that are different from a direction of a normal line to a placement surface of the plural optical fibers, the image pickup means picking up images of the plural optical fibers formed by the imaging optical system, wherein the imaging optical system comprises, in order from the side of the plural optical fibers, a pre-lens system, an aperture stop having an aperture at a position of a rear focus of the pre-lens system, and a post-lens system having a front focus at the position of the rear focus of the pre-lens system, wherein the image pickup plane of the image pickup means is inclined relative to the optical axis of the imaging optical system such that the longer the object distance of an optical fiber is, the shorter its image distance becomes and wherein the image pickup plane of the image pickup means is positioned in parallel to the optical axes of the plural optical fibers.

With this observation apparatus for optical fibers, light, which emerges from the plural optical fibers as observed objects illuminated by a light source, is focused on the image pickup plane of the image pickup means and is picked up by the image pickup means.

In this apparatus the imaging optical system is disposed on each of the two different optical axes which are almost normal to the optical axes of the plural optical fibers and which are not normal to the placement surface of the plural optical fibers, and the image pickup means has the image pickup plane located substantially in parallel to the optical axes of the optical fibers and inclined relative to the optical axis of the imaging optical system such that the longer the object distance is, the shorter the image distance becomes. Consequently, the in-focus range is widened on the image pickup plane of the image pickup means, so that focus is achieved for all of multiple pairs (for example, twelve pairs) of optical fibers, whereby clear images of the all optical fibers can be obtained at once. Since the imaging optical system is constructed as described above including the pre-lens system, the aperture stop, and the post-lens system, the magnifications of the images picked up by the image pickup means are constant and uniform independent of the positions of the optical fibers.

In the observation apparatus for optical fibers according to the present invention, the pre-lens system and post-lens system may be equivalent to each other and are located in symmetry with each other with respect to the position of the aperture of the aperture stop. In this case, coma is canceled of the images formed by the imaging optical system, and an excellent quality is attained in the images of the optical fibers picked up by the image pickup means.

In another embodiment, the observation apparatus for optical fibers according to the present invention further comprises means for correcting a difference in the object distance of each optical fiber among the plural optical fibers, the object distance difference correcting means being disposed between the plural optical fibers and the imaging optical system. In this case, differences of the object distance due to the different positions of the respective optical fibers are corrected so that differences of image distance become smaller and thereby the angle formed by the image pickup plane of the image pickup means and the optical axis of the imaging optical system approaches to the right angle. Therefore, the image pickup means can be constructed in a compact size, which enables to reduce the size of the observation apparatus as a whole. The object distance difference correcting means is preferably a prism having a cross section of a wedge shape.

A fusion splicer for fibers according to the present invention is an apparatus for fusion-splicing end faces of plural pairs of optical fibers kept opposite to each other. It comprises (1) the observation apparatus for optical fibers described above for picking up images of the plural pairs of optical fibers, (2) inspection means for determining whether the plural pairs of optical fibers are in a fusion-spliceable state, based on the images of the plural pairs of optical fibers picked up by the observation apparatus for optical fibers, and (3) fusion splicing means for fusing and splicing the end faces of the plural pairs of optical fibers to each other, based on a determination result obtained by the inspection means.

When using fusion splicers, the axial and angular shifts of optical fibers should be monitored to decrease the splicing loss by capturing the images of the fibers.

According to the present fusion splicer for optical fibers, the observation apparatus for optical fibers described above picks up the images of the plural pairs of optical fibers with their end faces opposite to each other, the inspection means determines whether fusion splicing is possible, based on the images, and the fusion splicing means fuses and splices the optical fibers when the inspection means determines that fusion splicing is possible. Accordingly, observation and inspection of the plural pairs of optical fibers can be carried out together in a short time, so that the process time for fusion splicing of optical fibers becomes shorter.

An observation unit according to the present invention comprises an imaging optical system and image pickup means, which are disposed in this order from the side of the object on the optical axis. The image pickup means picks up an image of the object formed by the imaging optical system. The imaging optical system comprises, in order as described from the side of the observed object, a pre-lens system, an apertures stop having an aperture at a position of a rear focus of the pre-lens system, and a post-lens system having a front focus at the position of the rear focus of the pre-lens system. An image pickup plane of the image pickup means is located as inclined relative to the optical axis of the imaging optical system.

This observation unit is suitably applicable to the above observation apparatus for optical fibers and the above fusion splicer for optical fibers. With this observation unit, the imaging optical system focuses the light emerging from the observed object (for example, a plurality of optical fibers located in parallel and in a flat shape, or the like), on the image pickup plane of the image pickup means, and the image pickup means picks up the image of the observed object. In the case wherein the imaging optical system is disposed on the optical axis substantially normal to the optical axes of the above optical fibers and different from the normal direction to the placement surface of the optical fibers and wherein the image pickup plane of the image pickup means is located so as to be substantially parallel to the optical axes of the plural optical fibers and be inclined relative to the optical axis of the imaging optical system such that the longer the object distance is, the shorter the image distance becomes. Consequently, the in-focus range is widened on the image pickup plane of the image pickup means, so that on-focus is achieved for all of multiple pairs (for example, twelve pairs) of optical fibers, thus enabling to obtain clear images of the all optical fibers at once. Since the imaging optical system is constructed as described above including the pre-lens system, aperture stop, and post-lens system, the magnifications of the images picked up by the image pickup means become constant and uniform independent of the positions of the optical fibers. It is preferable that the angle between the optical axis of the imaging optical system and the image pickup plane of the image pickup means be properly determined according to an angle between the optical axis of the imaging optical system and the normal line to the placement surface of the observed object.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The embodiments of the present invention will be described in detail by reference to the accompanying drawings. In the description of the drawings the same elements will be denoted by the same reference symbols and redundant description will be omitted.

Figure 1:
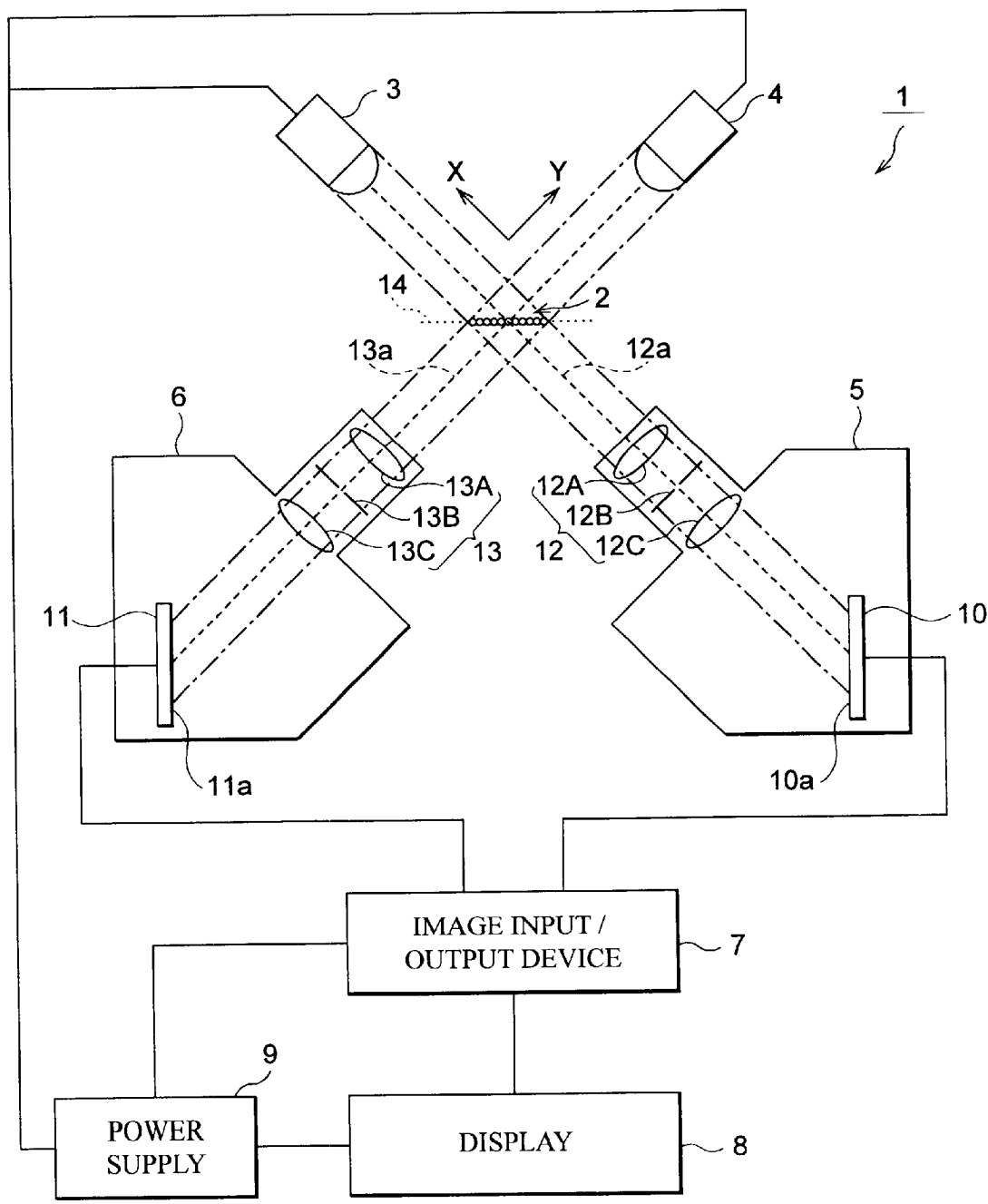
FIG. 1 is a block diagram to show an embodiment of the observation apparatus for optical fibers according to the present invention.

FIG. 1 is a block diagram showing an embodiment of the observation apparatus for optical fibers according to the present invention. This figure is a view in the direction along the optical axes of plural optical fibers 2 to be observed. This observation apparatus for optical fibers 1 has a pair of light sources 3, 4 located obliquely above a placement surface 14 on either side of a plurality (for example, twelve pairs) of optical fibers 2 located in parallel and in a flat shape on the placement surface 14, and a pair of microscope cameras (observation units) 5, 6 located obliquely below the placement surface 14. Each microscope camera 5, 6 is a camera for picking up images of the plural optical fibers 2 back-illuminated by each light source 3, 4. The two microscope cameras 5, 6 may be integrated into one unit.

The observation apparatus for optical fibers 1 has an image input/output device 7 for taking in the images of the optical fibers 2 outputted from the microscope cameras 5, 6, and a display 8 for displaying an image outputted from the image input/output device 7. The observing apparatus 1 is also provided with a power supply 9 for supplying power to each of the pair of light sources 3, 4, the image input/output device 7, and the display 8.

Each of the microscope cameras 5, 6 has an imaging optical system 12, 13 for receiving light from the optical fibers 2 and forming images thereof, and a CCD (image pickup device) 10, 11 for picking up the images. The imaging optical systems 12, 13 are microscopes having the same magnification. Each imaging optical system 12, 13 is located on the optical path between the light source 3, 4 and the CCD 10, 11. The optical axes 12a, 13a of the imaging optical systems 12, 13 are set in two directions almost normal to the optical axes of the optical fibers 2 and different from the normal direction to the placement surface 14. For example, each optical axis 12a, 13a is set at the inclination of 45° to the placement surface 14 while passing the center of the cross section of the optical fibers 2. In this case, because the optical axis 12a of the imaging optical system 12 is perpendicular to the optical axis 13a of the imaging optical system 13, the optical fibers 2 are observed in the two directions perpendicular to each other (in the X-direction and in the Y-direction).

The imaging optical system 12 is composed of a pre-lens 12A, an aperture stop 12B, and a post-lens 12C located in order from the side of the optical fibers 2, and similarly, the imaging optical system 13 is composed of a pre-lens 13A, an aperture stop 13B, and a post-lens 13C located in order from the side of the optical fibers 2. Here, each of the pre-lenses 12A, 13A and post-lenses 12C, 13C may be either a single convex lens or a combination of lenses. It is also noted that the optical axes 12a and 13a do not always have to be perpendicular to each other, but they may be set in any mutually different directions.

Figure 2:
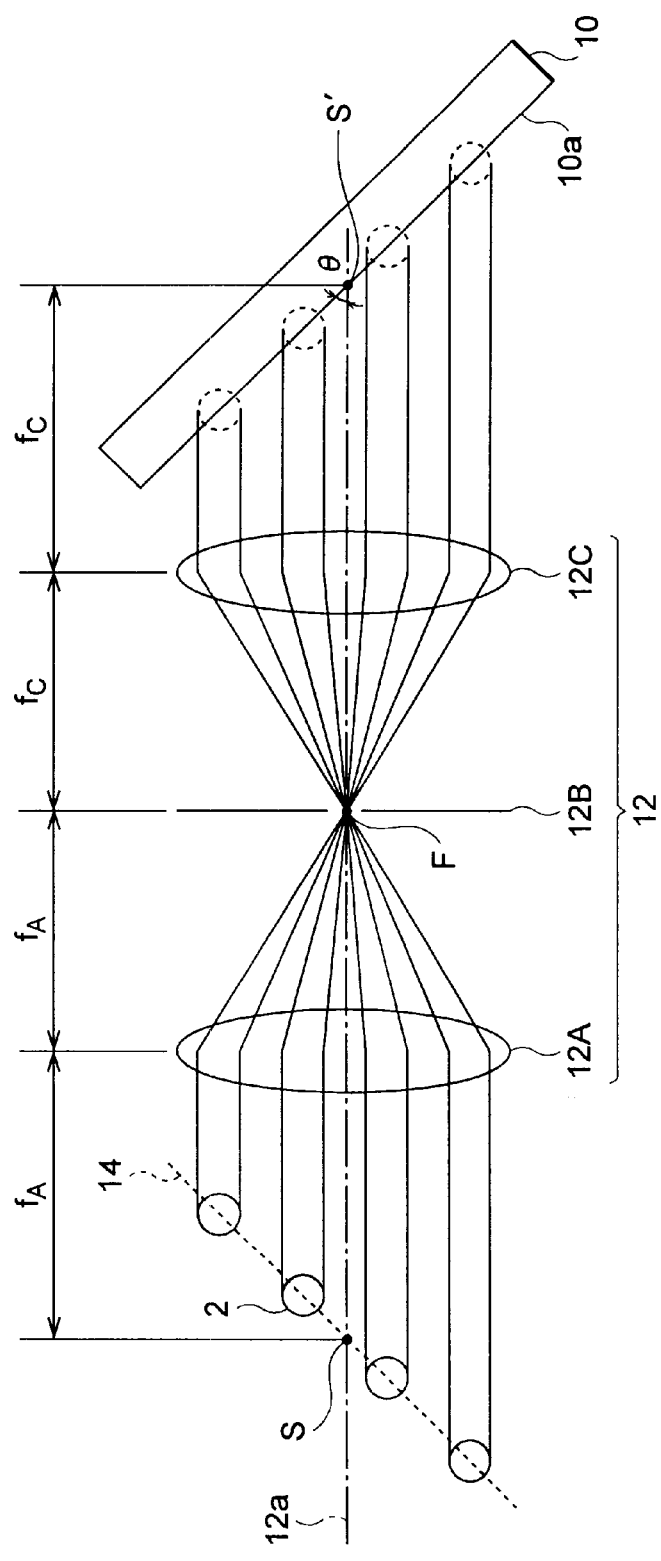
FIG. 2 is an explanatory drawing to show an imaging optical system of the observation apparatus for optical fibers according to the present embodiment.

The imaging optical system 12 will be described below in detail. The imaging optical system 13 also has the same structure. FIG. 2 is an explanatory drawing of the imaging optical system 12. This figure is also a view in the direction along the optical axes of the optical fibers 2. As illustrated in this figure, the optical axis 12a of this imaging optical system 12 passes the center position S of the row of optical fibers 2, is nearly normal to the optical axes of the optical fibers 2, and is inclined at 45° to the placement surface 14 of the optical fibers 2.

In the imaging optical system 12 there are the pre-lens 12A, aperture stop 12B, and post-lens 12C located in order from the side of optical fibers 2. Specifically, the aperture stop 12B is located so as to have an aperture at the position of the rear focus of the pre-lens 12A, and the post-lens 12C is located so that the front focus thereof is located at the position of the rear focus of the front lens 12A. The aperture stop 12B has the aperture in its certain area including the optical axis 12a. Namely, the rear focus position of the pre-lens 12A is almost coincident with the front focus position of the post-lens 12C, and they are at the aperture of the aperture stop 12B.

In the imaging optical system 12 constructed as described above, the principal rays emerging in parallel to the optical axis 12a from the optical fibers 2 back-illuminated by the light source 3 are converged at the rear focus position F by the pre-lens 12A to pass through the aperture of the aperture stop 12B. Then they are converted again into the principal rays parallel to the optical axis 12a by the post-lens 12C to reach the image pickup plane 10a of the CCD 10. Therefore, the magnifications of the images of the optical fibers 2 formed on the image pickup plane 10a of the CCD 10 are constant or uniform regardless of either one of the optical fibers 2. The magnifications are also constant even if the locations of the optical fibers 2 vary in the direction of the optical axis 12a of the imaging optical system 12 or even if the position of the image pickup plane 10a of the CCD 10 varies. The magnification of the imaging optical system 12 is represented by $f_C/f_A$, and the magnification of an image picked up by the CCD 10 is determined by the magnification of the imaging optical system 12, the angle between the placement surface 14 of the optical fibers 2 and the optical axis 12a, and the angle between the image pickup plane 10a of CCD 10 and the optical axis 12a. Note that the focal distances $f_C$, $f_A$ of lenses 12A, 12C are shown in the figure.

Here, the pre-lens 12A and post-lens 12C are preferably lenses having the same structure and located in symmetry with each other with respect to the aperture stop 12B. This configuration enables easy placement of the pre-lens 12A, aperture stop 12B, post-lens 12C, and CCD 10, to cancel the coma, and to provide a good quality image through the CCD 10.

The center position S of the optical fibers 2 is preferably located at the position of the front focus of the pre-lens 12A. In this case, an image S' of the center position S is formed at the position of the rear focus of the post-lens 12C by the imaging optical system 12, where the beam generated from the center position S becomes parallel in the stop space, and aberration can be easily corrected to be well balanced.

With this imaging optical system 12, each object distance (the optical distance between an optical fiber and the pre-lens 12A) differs depending upon each position of the optical fibers 2. When the images of the optical fibers are obtained with the image distances (optical distances between the post-lens 12C and the positions of the images) being kept constant, that is, when the images are obtained with keeping the image pickup plane normal to the optical axis 12a, degrees of defocus vary depending upon the positions of the respective fibers. In order to solve this problem due to the differences in the object distances, the image pickup plane 10a of the CCD 10 is positioned so as to be nearly parallel to the optical axes of the optical fibers 2 and be inclined relative to the optical axis 12a of the imaging optical system 12. For each of the optical fibers 2, the image formation condition is satisfied by inclining the image pickup plane 10a such that the longer its object distance is, the shorter its image distance becomes. This arrangement broadens the in-focus range on the image pickup plane 10a of the CCD 10, and a desirable focusing is achieved for each of the optical fibers 2. Thus, clear images of all optical fibers 2 are outputted from the CCD 10.

The optimum value of the angle θ between the image pickup plane 10a of the CCD 10 and the optical axis 12a of the imaging optical system 12 can be approximately calculated by the paraxial image formation formula according to the so-called Scheimpflug principle. It can also be obtained more accurately by performing a ray tracing simulation. According to this, the angle θ can be set in the range of 45° to 27° in order to observe the optical fibers 2 in the magnifications of 1× to 2×.

In the observation apparatus for optical fibers 1 according to the present embodiment, the angle θ formed by the image pickup plane 10a and the optical axis 12a is set to 45°, and the magnification is ×1. As described above, the angle between the optical axis 12a and the placement surface 14 of the optical fibers 2 is also 45° as described above. Therefore, the angle between the placement surface 14 and the image pickup plane 10a is the right angle, and hence distortion is very small in the images of the optical fibers 2 formed on the image pickup plane 10a.

The above description about the imaging optical system 12 referring to FIG. 2 are also applicable to the imaging optical system 13. Accordingly, the images of the optical fibers 2, picked up by the CCDs 10, 11 and displayed through the image input/output device 7 on the display 8, have the constant magnification independent of the respective positions the optical fibers 2 and are sharp with less blur. Therefore, states of even the plurality (for example, twelve pairs) of optical fibers 2 can be observed at once, so that the positions and end face states of the optical fibers 2 can be captured on the display in a short time.

Figure 3A:
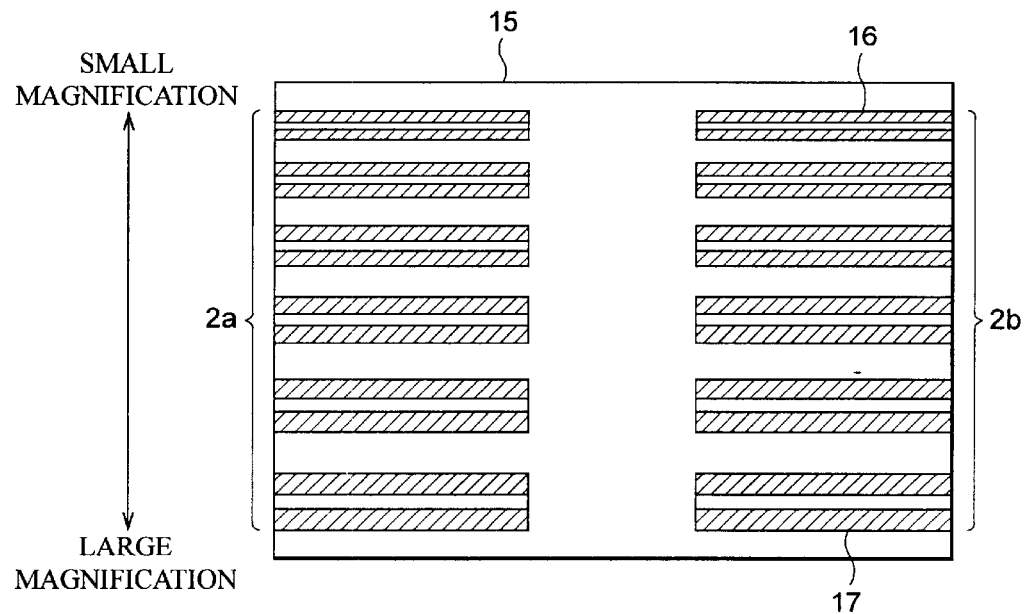
FIG. 3A is a drawing to show an image obtained by the observation apparatus for optical fibers according to the comparative example and FIG. 3B is a drawing to show an image obtained by the observation apparatus for optical fibers according to the present embodiment.
Figure 3B:
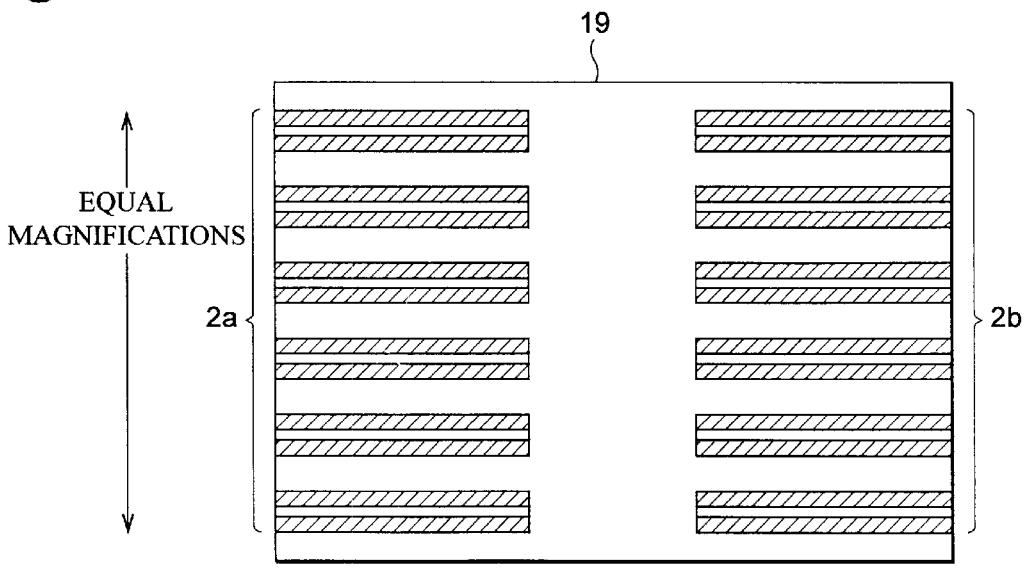

FIG. 3A and FIG. 3B are drawings to show examples of observed images of the optical fibers. Each figure shows an image of multiple pairs of optical fibers with their end faces located close to each other. FIG. 3A is a drawing to show an image obtained by the observation apparatus for optical fibers according to the comparative example and FIG. 3B is a drawing to show an image obtained by the observation apparatus for optical fibers according to the present embodiment. These figures show the case where six pairs of optical fibers with their end faces opposite to each other are observed.

In the image 15 obtained by the observation apparatus for optical fibers according to the comparative example, as shown in FIG. 3A, the magnification in the case of an image 16 of the optical fiber farthest from the microscope camera is the smallest of the optical fiber images, and the magnifications gradually increase with decreasing distances between the optical fibers and the microscope camera, and the magnification in the case of an image 17 of the optical fibers closest to the microscope camera becomes the largest of the optical fiber images. This is because the object distance and image distance differ depending upon each position of the optical fiber 2 and the real magnification of each optical fiber image formed on the image pickup plane of the microscope camera also varies according thereto. Therefore, the observation apparatus for optical fibers according to the comparative example needed the image processing to correct this nonuniformity of magnifications of images, which resulted in increase in the size and cost of the apparatus.

In contrast, the optical fiber observation apparatus 1 according to the present embodiment has the structure of the imaging optical systems 12, 13 constructed as described above, and consequently in the image 19 obtained by it the magnification of the images are constant for all of optical fibers 2 as shown in FIG. 3B. Therefore, the observation apparatus for optical fibers 1 according to the present embodiment does not need the image processing for to making the magnifications of the images uniform, and hence that the time necessary for determination of the positions of the optical fibers is short, and the size and cost of the apparatus can be decreased.

Figure 4:
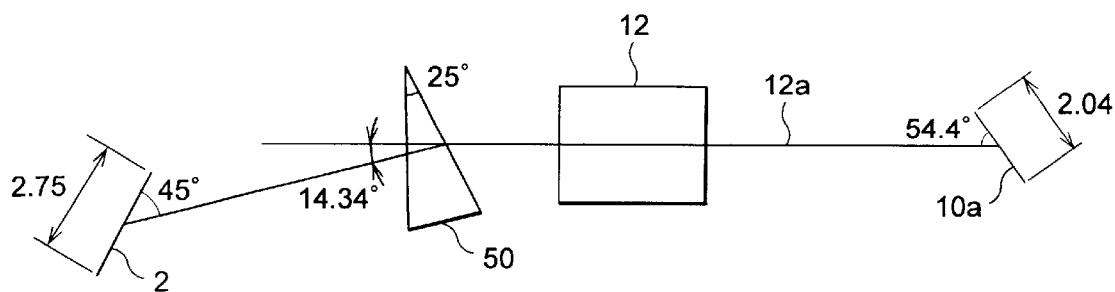
FIG. 4 is a block diagram to show a first modification example of the optical system from a plurality of optical fibers to the image pickup plane.
Figure 5:
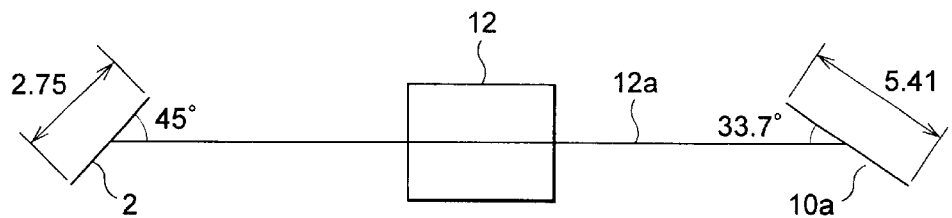
FIG. 5 is a block diagram to show a second modification example of the optical system from a plurality of optical fibers to the image pickup plane.

A variety of modifications can be contemplated in addition to the structure shown in FIG. 2, for the optical system from the optical fibers 2 through the imaging optical system 12 to the image pickup plane 10a of the CCD 10. Two modified examples will be described below. It should be noted that the same is also applicable to the optical system from the optical fibers 2 through the imaging optical system 13 to the image pickup plane 11a of the CCD 11. In FIG. 4 and FIG. 5 described below, the imaging optical system 12, composed of the pre-lens 12A, aperture stop 12B, and post-lens 12C, is illustrated as a block and the plurality of optical fibers 2 located in parallel and in a flat shape are illustrated as a line segment, for simplicity.

FIG. 4 is a block diagram to show the first modification example of the optical system from the optical fibers 2 to the image pickup plane 10a. In this example a prism 50, which is a means for correcting the difference in the object distance depending upon the respective positions of the plural optical fibers 2, is provided on the optical axis 12a between the optical fibers 2 and the imaging optical system 12. The prism 50 has its cross section of a wedge shape and is located so that the ridge line thereof is parallel to the optical axis direction of the optical fibers 2 and is present on the side of the optical fibers with shorter object distances. Namely, the longer the object distance, the longer a distance of a principal ray passage through the prism 50.

For example, supposing the apical angle of this prism 50 is 25°, the refractive index is 1.5, and an angle of incidence is 90°, then the angle of deviation is 14.34°. When the magnification of the imaging optical system 12 is ×1, the angle between the optical axis 12a and the plane on which the image pickup plane 10a is to be placed is 54.4°, which is greater than 45° in the case of FIG. 2. This means that the differences of the object distance due to the different positions of the respective optical fibers 2 are corrected and consequently the differences of their image distances to be set are decreased even if the angle formed by the placement plane 14 of the optical fibers 2 and the optical axis 12a of the imaging optical system 12 is the same as FIG. 2, namely, 45°.

For example, let us consider a case where the distance between the two outermost fibers of the twelve pairs of optical fibers 2 arranged at intervals of 0.25 mm is 2.75 mm (=0.25 mm×11). Without the prism 50 (i.e., in the case of FIG. 2), the distance between the two corresponding end fibers in the image on the image pickup plane 10a is 2.75 mm; whereas, in the case of this modification example, the distance is only 2.04 mm. Since the image of the optical fibers 2 formed on the image pickup plane 10a becomes smaller as described, the CCD 10 can be of a compact size.

FIG. 5 is a block diagram to show the second modification example of the optical system from the optical fibers 2 to the image pickup plane 10a. In this example the magnification ($f_C/f_A$) of the imaging optical system 12 is ×1.5. In this case the angle is 33.7° between the optical axis 12a and the plane on which the image pickup plane 10a is to be placed. If the distance is 2.75 mm between the both end fibers of the twelve optical fibers 2 arranged at the intervals of 0.25 mm, the distance will be 5.41 mm between the corresponding both end fibers in the image on the image pickup plane 10a. As described, the larger the magnification of the imaging optical system 12, the smaller the angle θ between the image pickup plane 10a and the optical axis 12a and the larger the image. Therefore, the CCD 10 needs to be of a large size.

Figure 6:
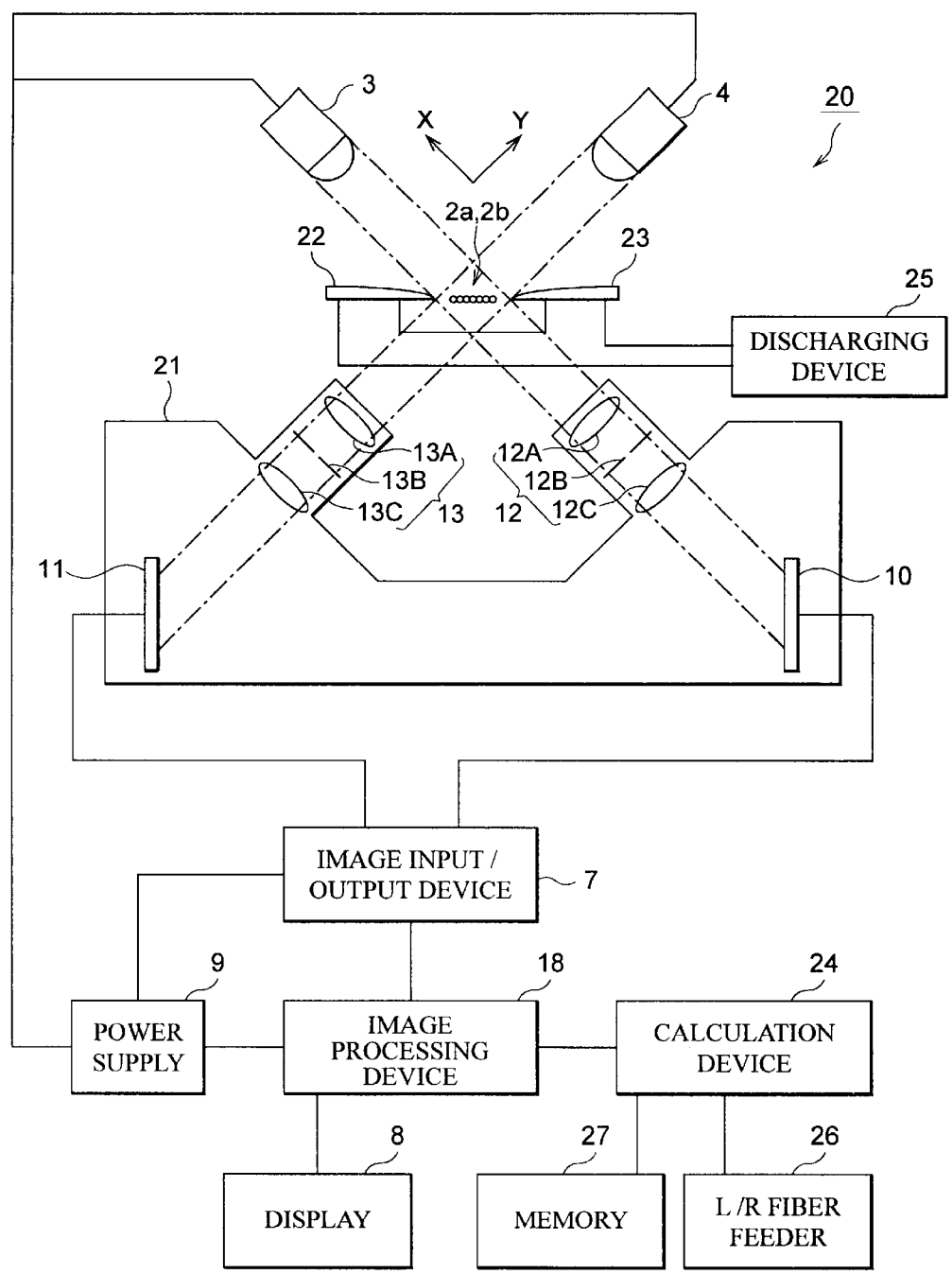
FIG. 6 is a block diagram to show an embodiment of the fusion splicer for optical fibers according to the present invention.

Next described referring to FIG. 6 is an embodiment of the fusion splicer for optical fibers incorporating the observation apparatus for optical fibers described above. The same or like components as those in the observation apparatus for optical fibers 1 are denoted by the same reference symbols and the description thereof is omitted herein.

The fusion splicer for optical fibers 20 according to the present embodiment comprises: a pair of light sources 3, 4 for radiating light from obliquely above to the multiple pairs of multiple fibers (for example, twelve pairs), optical fibers 2a, 2b arranged in a flat shape with the end faces thereof opposite to each other; a microscope camera 21 for picking up images of the multiple optical fibers 2a, 2b in two directions, located obliquely below the multiple optical fibers 2a 2b; an image input/output device 7 for receiving an image outputted from the microscope camera 21; an image processing device 18 for performing image processing of the image outputted from the image input/output device 7; a display 8 for displaying an image outputted from the image processing device 18; and a power supply 9 for supplying power to each device.

Further, the fusion splicer for optical fibers 20 has a pair of discharging electrodes 22, 23 located on either side of the portion where the end faces of the multiple optical fibers 2a, 2b are opposed to each other, a calculation device (inspection means) 24 for analyzing the image outputted from the image processing device 18 to determine whether fusion splicing is possible as to the positions and end face states of the multiple optical fibers 2a, 2b, and a discharging device 25 for applying a high voltage to the discharging electrodes 22, 23 when the calculation device 24 determines that the fusion splicing is possible. In addition, the fusion splicer for optical fibers 20 is provided with left and right fiber feeders 26 for bringing the facing optical fibers 2a, 2b into contact with each other in each pair when the calculation device 24 determines that the fusion splicing is possible, and a memory device 27 for storing determination data used in the determination process of the calculation device 24.

The calculation device 24 takes in the images of the multiple optical fibers 2a, 2b outputted from the image processing device 18 and analyzes them to perform inspections, based on the determination data stored in the memory device 27, as to whether there is an offset of axis between each pair of mutually opposing optical fibers to be fusion-spliced, whether there is a vacancy or the like in the array of the multiple optical fibers 2a, 2b, whether there is breakage or the like in the end face of each optical fiber, and so on. When these inspections result in determining that fusion splicing is possible, the calculation device 24 first sends a signal of driving instruction to the left and right fiber feeders 26. This signal drives the left and right fiber feeders 26, so as to make the both end faces of the opposed multiple optical fibers 2a, 2b closer to each other. After that, the calculation device 24 supplies a signal of driving instruction to the discharging device 25. This signal causes the high voltage to be placed between the discharging electrodes 22, 23, whereby the end faces of the respective optical fibers are fused together. At this time, one of the left and right fiber feeders 26 is driven to further push one side of the multiple optical fibers 2a, 2b a little, whereby the multiple optical fibers 2a, 2b opposing each other are fusion-spliced at one time.

Figure 7A:
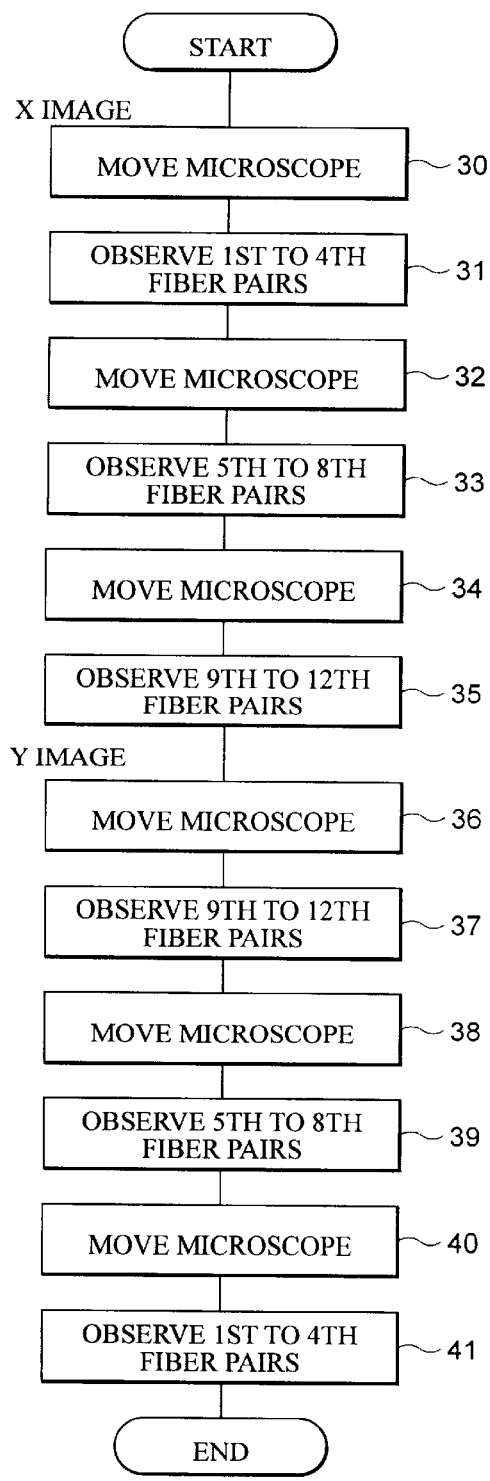
FIG. 7A and FIG. 7B are flowcharts to show fiber observation steps in the fusion splicer for optical fibers according to the comparative example and in the fusion splicer for optical fibers according to the present embodiment, respectively.
Figure 7B:
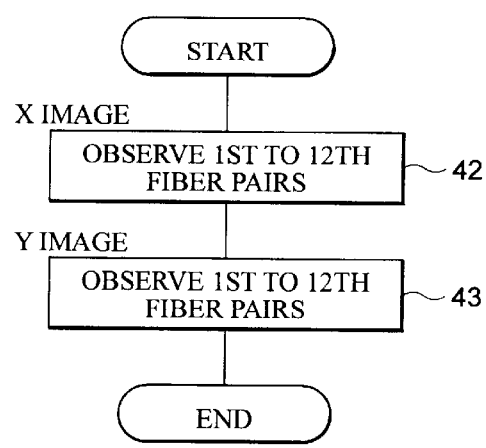

FIG. 7A and FIG. 7B are flowcharts to show the fiber observation steps in the fusion splicer for optical fibers according to a comparative example and in the fusion splicer for optical fibers according to the present embodiment, respectively.

As shown in the figure, the multiple optical fibers were observed every four fibers in the fusion splicer for optical fibers according to the comparative example. For observing the optical fibers of twelve fiber pairs, the fusion splicer according to the comparative example needed to perform three observations while moving the microscope, and thus the measurement took a long time. More specifically, when the multiple optical fibers are observed in the two directions (in the X-direction and in the Y-direction) obliquely below the optical fibers, the X-directional microscope is first moved (step 30), and then X-directional observation is carried out for the optical fibers of the first fiber pair to the fourth fiber pair (step 31). Then the X-directional microscope is moved a little (step 32) and X-directional observation is carried out for the optical fibers of the fifth fiber pair to the eighth fiber pair (step 33). Then the X-directional microscope is further moved a little (step 34) and the X-directional observation is carried out for the optical fibers of the ninth fiber pair to the twelfth fiber pair (step 35). The process of the above steps 30 to 35 obtains an X-directional image of the optical fibers of the twelve fiber pairs.

Then the Y-directional microscope is moved (step 36) and Y-directional observation is carried out for the optical fibers of the ninth fiber pair to the twelfth fiber pair (step 37). Then the Y-directional microscope is moved a little (step 38) and Y-directional observation is carried out for the optical fibers of the fifth fiber pair to the eighth fiber pair (step 39). Then the Y-directional microscope is further moved a little (step 40) and Y-directional observation is carried out for the optical fibers of the first fiber pair to the fourth fiber pair (step 41). The process of the above steps 36 to 41 obtains a Y-directional image of the optical fibers of the twelve fiber pairs.

In contrast with it, the fusion splicer for optical fibers 20 according to the present embodiment can observe and measure the fibers at a time by the above observation apparatus for optical fibers even in the case of observation of the optical fibers 2a, 2b of twelve fiber pairs, so that the measuring time is very short. More specifically, when the multiple optical fibers 2a, 2b are observed in the two directions (in the X-direction and in the Y-direction) obliquely below the optical fibers, the optical fibers 2a, 2b of twelve fiber pairs are first measured at one time in the X-direction with the CCD 10 (step 42) and then the optical fibers 2a, 2b of twelve fiber pairs are measured at one time in the Y-direction with the CCD 11 (step 43). This obtains the X-directional image and the Y-directional image of the optical fibers 2a, 2b of the twelve fiber pairs.

As described above, the fusion splicer for optical fibers 20 according to the present embodiment can obtain the two-directional images of the optical fibers 2a, 2b of the twelve fiber pairs by the process of just two steps, so that the number of processing steps is drastically decreased as compared with the fusion splicer for optical fibers according to the comparative example. This decreases the measurement time of the multiple optical fibers 2a, 2b in the fusion splicer for optical fibers 20.

Since each imaging optical system 12, 13 is constructed as described above in the observation apparatus for optical fibers, which is a part of the fusion splicer for optical fibers 20, the magnifications are uniform for the images of the multiple optical fibers 2a, 2b picked up by each CCD 10, 11, so that no image processing for uniforming the magnifications is especially necessary in the image processing device 18. The measurement time of the multiple optical fibers 2a, 2b is also decreased in this aspect.

Since the microscopes are not moved in the observation process of the fusion splicer for optical fibers 20, no driving mechanism is necessary for the microscopes. Therefore, the apparatus structure of the fusion splicer for optical fibers 20 can be simplified, and the size and weight of the apparatus can be decreased.

Figure 8:
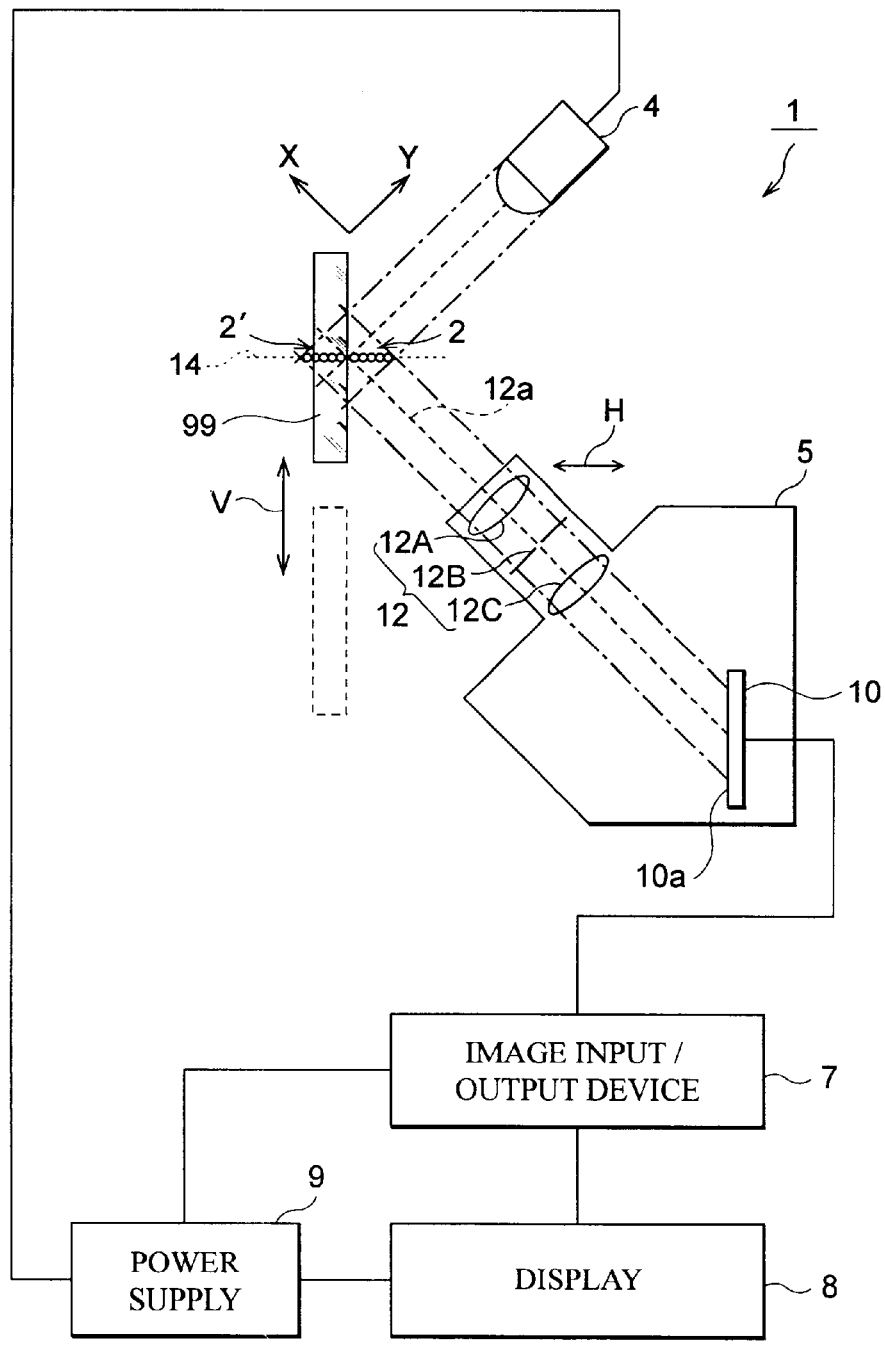
FIG. 8 is a block diagram to show another embodiment of the observation apparatus for optical fibers according to the present invention.
Figure 9:
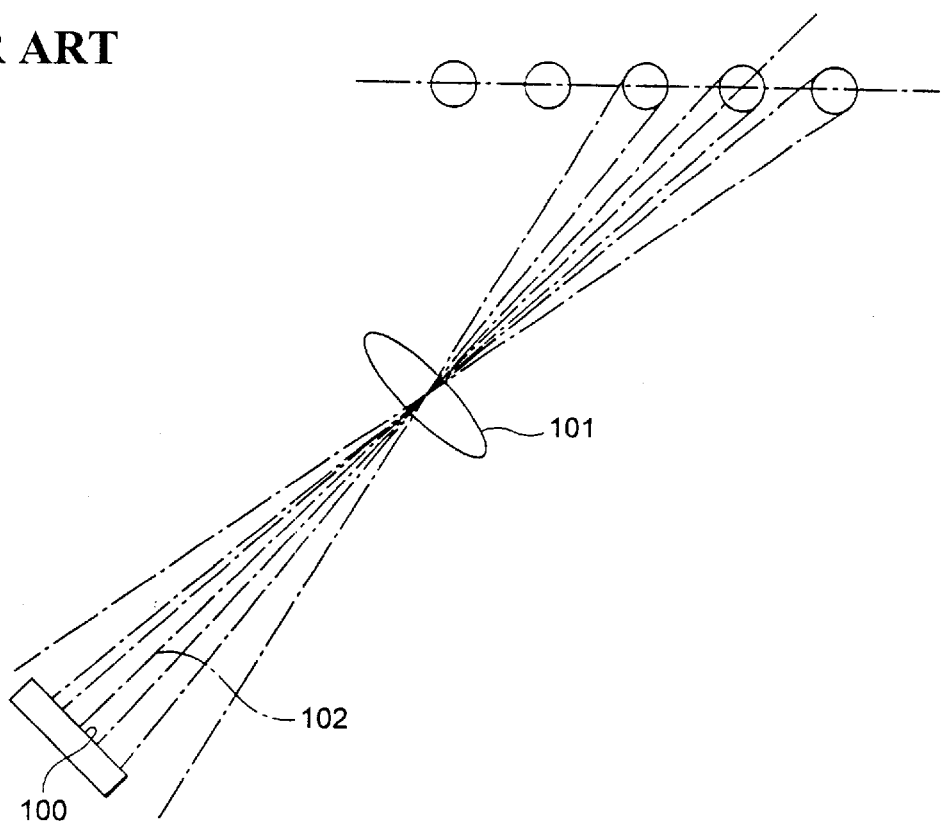
FIG. 9 is a drawing to show the optical system of the observation apparatus for optical fibers according to the comparative example.

FIG. 8 is a block diagram to show another embodiment of the observation apparatus for optical fibers according to the present invention. When compared with the apparatus of FIG. 1, the present apparatus is an apparatus obtained by excluding the light source 3 and microscope unit 6 on the left side in the same drawing. Instead thereof, the present apparatus has a mirror 99 the normal line of which is perpendicular to the optical axes of the optical fibers 2, makes the angle of 45° with the optical axis of the imaging optical system 12, and makes the angle of 45° with the optical axis of the light source 4. The mirror 99 is arranged so as to be movable along the directions (V) perpendicular to the normal line and the microscope unit 5 is movable along the normal direction (H) to the mirror 99.

Transmission images of the optical fibers, observed when the optical fiber pairs 2 are seen in the X-direction, are obtained in such a manner that the light emitted from the light source 4 is reflected by the mirror 99, the reflected light passes through the optical fiber pairs 2, and the light is incident to the microscope unit 5.

Transmission images of the optical fibers, observed when the optical fiber pairs 2 are seen in the Y-direction, are obtained in such a way that the light emitted from the light source 4 passes through the optical fiber pairs 2, the transmitted light is reflected by the mirror 99, and the light is incident to the microscope unit 5. Thus, X-direction images and Y-direction images are obtained simultaneously with one image pickup plane. Reference numeral 2' designates a mirror image of the optical fiber image in this case. The mirror 99 is moved down during setting of the optical fiber pairs 2. Since the present apparatus uses only one imaging optical system, the manufacturing cost thereof can be decreased.

As detailed above, the observation apparatus for optical fibers according to the present invention is constructed so that the light emerging from the optical fibers as observed objects illuminated by the light source is focused on the image pickup plane of the image pickup means by the imaging optical system and that the images are picked up by the image pickup means. In this structure, the imaging optical system is disposed on each of the two mutually different optical axes that are nearly normal to the optical axes of the optical fibers and different from the normal direction to the placement surface of the optical fibers, and the image pickup means has the image pickup plane located so as to be nearly parallel to the optical axes of the optical fibers and so as to be inclined relative to the optical axis of the imaging optical system so that the longer the object distance, the shorter the image distance; therefore, the in-focus range is widened on the image pickup plane of the image pickup means, so that focus is achieved for all of the optical fibers of multiple fiber pairs (for example, twelve fiber pairs), thus obtaining clear images of the all optical fibers at once. Since the imaging optical system is constructed as described above including the pre-lens system, aperture stop, and post-lens system, the magnifications of the images picked up by the image pickup means are constant and uniform independent of the positions of the optical fibers. Therefore, even the optical fibers of many fiber pairs can also be observed within a short time and the image processing for uniforming the magnifications of images becomes unnecessary. Therefore, the size and cost can be decreased.

When the pre-lens system and post-lens system are equivalent to each other and are positioned in symmetry with each other with respect to the position of the aperture of the aperture stop, the coma is canceled in the images formed by the imaging optical systems, and consequently the images of the optical fibers picked up by the image pickup means are of good quality.

When the apparatus further has the object distance difference correcting means for correcting the difference in the object distance of each optical fiber among a plurality of optical fibers, disposed between the optical fibers and the imaging optical system, it corrects differences among the object distances depending upon the positions of the respective optical fibers, differences of image distances to be set become small, and the angle between the image pickup plane of the image pickup means and the optical axis of the imaging optical system approaches the right angle. Therefore, the entire optical fiber observation apparatus as well as the image pickup means can be constructed in a compact size. The object distance difference correcting means is preferably a prism having the cross section of the wedge shape.

With the fusion splicer for optical fibers according to the present invention, images of plural pairs of optical fibers with their end faces opposite to each other are picked up by the above-described observation apparatus for optical fibers, the inspection means determines whether fusion splicing is possible, based on the images, and the fusion splicing means carries out fusion splicing of the fibers when the inspection means determines that fusion splicing is possible. Accordingly, observation and inspection of the plural pairs of optical fibers is carried out at once within a short time, and the process time of fusion splicing of optical fibers is shortened. The structure becomes simpler, because the driving section, necessitated before, becomes unnecessary.

With the observation unit according to the present invention, the light emerging from the observed object (for example, a plurality of optical fibers arranged in parallel and in the flat shape, or the like) is focused on the image pickup plane of the image pickup means by the imaging optical system, and the image of the observed object is picked up by the image pickup means. In the case wherein the imaging optical system is disposed on the optical axis nearly normal to the optical axes of the above optical fibers and different from the normal direction to the placement surface of the optical fibers and wherein the image pickup plane of the image pickup means is located so as to be nearly parallel to the optical axes of the optical fibers and so as to be inclined relative to the optical axis of the imaging optical system so that the longer the object distance, the shorter the image distance, the in-focus range is widened on the image pickup plane of the image pickup means, so that focus is achieved for all of the optical fibers of multiple fiber pairs (for example, twelve fiber pairs), thus obtaining clear images of the all optical fibers at once. Since the imaging optical system is constructed as described above including the pre-lens system, aperture stop, and post-lens system, the magnifications of the images picked up by the image pickup means are constant and uniform independent of the positions of the optical fibers. This observation unit is suitably applicable to the above observation apparatus for optical fibers and the above fusion splicer for optical fibers.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An observation apparatus for optical fibers comprising:
   (A) a first imaging optical system located opposite to a plurality of pairs of optical fibers, said first imaging optical system comprising, in order from an object side:
      (a) a first pre-lens system,
      (b) a first aperture stop including an aperture at a position of rear focus of said first pre-lens system, and
      (c) a first post-lens system including a front focus at the position of the rear focus of said first pre-lens system; and
   (B) an image pickup device that picks up images of the optical fibers formed by said first imaging optical system, wherein a normal to an image pickup plane of said image pickup devices is inclined relative to the optical axis of said first imaging optical system, and wherein said image pickup plane is parallel to optical axes of said optical fibers.

2. An observation apparatus for optical fibers according to claim 1, further comprising a second imaging optical system for observing said pairs of optical fibers in a direction different from that of said first imaging optical system, said second imaging optical system having:
   (a) a second pre-lens system,
   (b) a second aperture stop including an aperture at a position of rear focus of said second pre-lens system, and
   (c) a second post-lens system including a front focus at the position of the rear focus of said second pre-lens system, wherein said second pre-lens system, said second aperture stop and said second post-lens system are arranged a way from said optical fibers in the order given.

3. An observation apparatus for optical fibers according to claim 2, wherein said first and second imaging optical systems are microscopes having a common magnification.

4. An fusion splicer for optical fibers comprising:
   the observation apparatus for optical fibers as set forth in claim 2; and
   a pair of discharging electrodes for fusing and splicing ends of said optical fibers, said discharging electrodes being disposed at respective positions on either side of a space between the ends of said plural pairs of optical fibers.

5. An observation apparatus for optical fibers according to claim 1, further comprising a mirror for deflecting the images of said optical fibers toward said first imaging optical system, said mirror being located near said optical fibers.

6. An observation apparatus for optical fibers according to claim 5, wherein said mirror is movable.

7. An observation apparatus for optical fibers according to claim 1, further comprising object distance difference correcting means for correcting a difference in an object distance of each optical fiber, said object distance difference correcting means being disposed between said pairs of optical fibers and said first imaging optical system.

8. An observation apparatus for optical fibers according to claim 7, wherein said object distance difference correcting means is a prism having a cross section of a shape.

9. An fusion splicer for optical fibers comprising:
the observation apparatus for optical fibers as set forth in claim 1; and
a pair of discharging electrodes for fusing and splicing ends of said optical fibers, said discharging electrodes being disposed at respective positions on either side of a space between the ends of said plural pairs of optical fibers.

10. An fusion splicer for optical fibers according to claim 9, further comprising inspection means for determining whether said pairs of optical fibers are in a state in which the optical fibers can be fused and spliced by said discharging electrodes, based on the images of said pairs of optical fibers picked up by said image pickup device.

11. An observation apparatus acceding to claim 1, wherein said pre-lens and said post-lens are lenses having the same structure and are symmetrically located with respect to said first aperture stop.

* * * * *